United States Patent [19]

Maino et al.

[11] Patent Number: 6,024,324
[45] Date of Patent: Feb. 15, 2000

[54] METHOD OF MONITORING AN EPICYCLIC ASSEMBLY OF A VEHICLE EQUIPPED WITH ACCELERATION SENSORS IN PARTICULAR A HELICOPTER

[75] Inventors: Bruno Maino, Samarate; Alberto Bellazzi, Cameri, both of Italy

[73] Assignee: Finmeccanica S.p.A., Rome, Italy

[21] Appl. No.: 09/110,306

[22] Filed: Jul. 6, 1998

[30] Foreign Application Priority Data

Jul. 4, 1997 [IT] Italy ................... TO97A0594

[51] Int. Cl.[7] ........................................ B64C 11/34
[52] U.S. Cl. ................. 244/17.13; 244/39; 244/60; 244/17.11; 180/337; 180/338
[58] Field of Search ................... 244/17.13, 39, 244/60, 17.11; 180/337, 338

[56] References Cited

U.S. PATENT DOCUMENTS 4,479,619  10/1984  Saunders et al. ............. 244/60
4,783,023  11/1988  Jupe ............................ 244/60

Primary Examiner—J. Woodrow Eldred
Attorney, Agent, or Firm—Darby & Darby

[57] ABSTRACT

The monitoring method includes the steps of: acquiring a signal from an acceleration sensor associated with an epicyclic assembly; sampling the signal at a predetermined sampling frequency to obtain an initial sequence of samples; dividing the samples in the initial sequence into groups, each defined by a predetermined number of samples; acquiring predetermined groups of samples; filtering the acquired groups of samples to obtain an intermediate sequence of samples; processing the intermediate sequence of samples to obtain a final sequence of samples; calculating a sixth-order moment of the final sequence of samples; and comparing the sixth-order moment with at least one predetermined threshold to detect any vibrational irregularity in the epicyclic assembly of the helicopter.

20 Claims, 9 Drawing Sheets

275 | 474 | 275

80 | 352 | 80

METHOD OF MONITORING AN EPICYCLIC ASSEMBLY OF A VEHICLE EQUIPPED WITH ACCELERATION SENSORS IN PARTICULAR A HELICOPTER

BACKGROUND OF THE INVENTION

The present invention relates to a method of monitoring an epicyclic assembly of a vehicle equipped with acceleration sensors, in particular a helicopter.

As is known, helicopter transmission members must be monitored continuously to immediately detect any faults or incipient malfunction conditions, and so prevent failure during flight.

For this purpose, the transmission is equipped with acceleration sensors, the signals of which are processed to determine any faults on the transmission. The methods currently used, however, to process the fault detection sensor signals are not sensitive enough to ensure fault detection well in advance of catastrophic failure, especially in the case of epicyclic assemblies, in which the signal, as opposed to being cyclic with respect to rotation of the connected shafts, is affected by approach and away movement of the planet gears.

SUMMARY OF THE INVENTION

It is an object of the present invention to provide a monitoring method ensuring reliable, advance detection of any faults or malfunction conditions which might result in failure.

According to the present invention, there is provided a method of monitoring an epicyclic assembly of a vehicle equipped with acceleration sensors, in particular a helicopter, characterized by comprising the steps of:

a) acquiring a signal from an acceleration sensor;

b) sampling said signal at a sampling frequency to obtain an initial sequence of samples;

c) dividing the samples in said initial sequence into groups, each defined by a predetermined number of samples, said groups of samples being arranged in succession and each having a respective position in said succession;

d) acquiring predetermined groups of samples; and e) processing said predetermined groups of samples to obtain a final sequence of samples.

BRIEF DESCRIPTION OF THE DRAWINGS

A number of non-limiting embodiments of the invention will be described by way of example with reference to the accompanying drawings, in which.

DETAILED DESCRIPTION OF THE INVENTION

Figure 1:
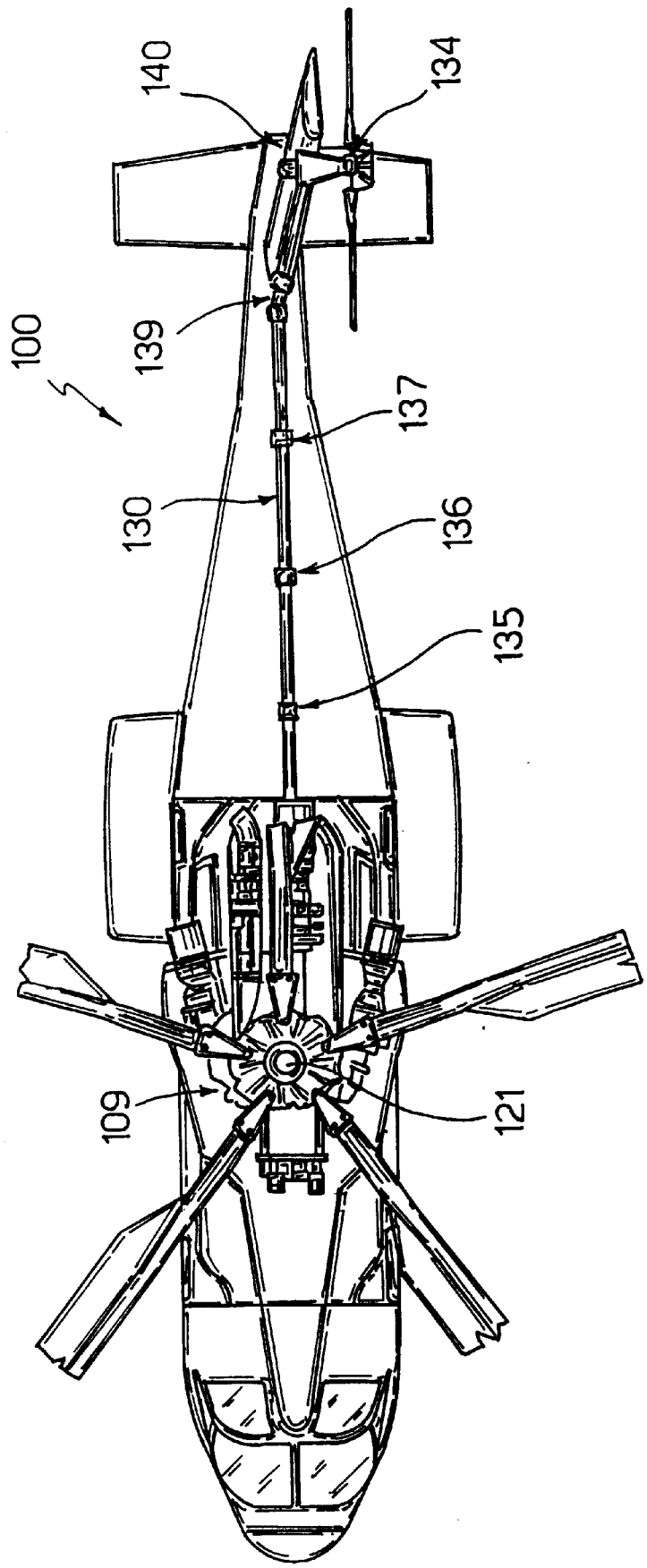
FIG. 1 shows a top plan view of a helicopter, in which the helicopter transmission is shown schematically.
Figure 2:
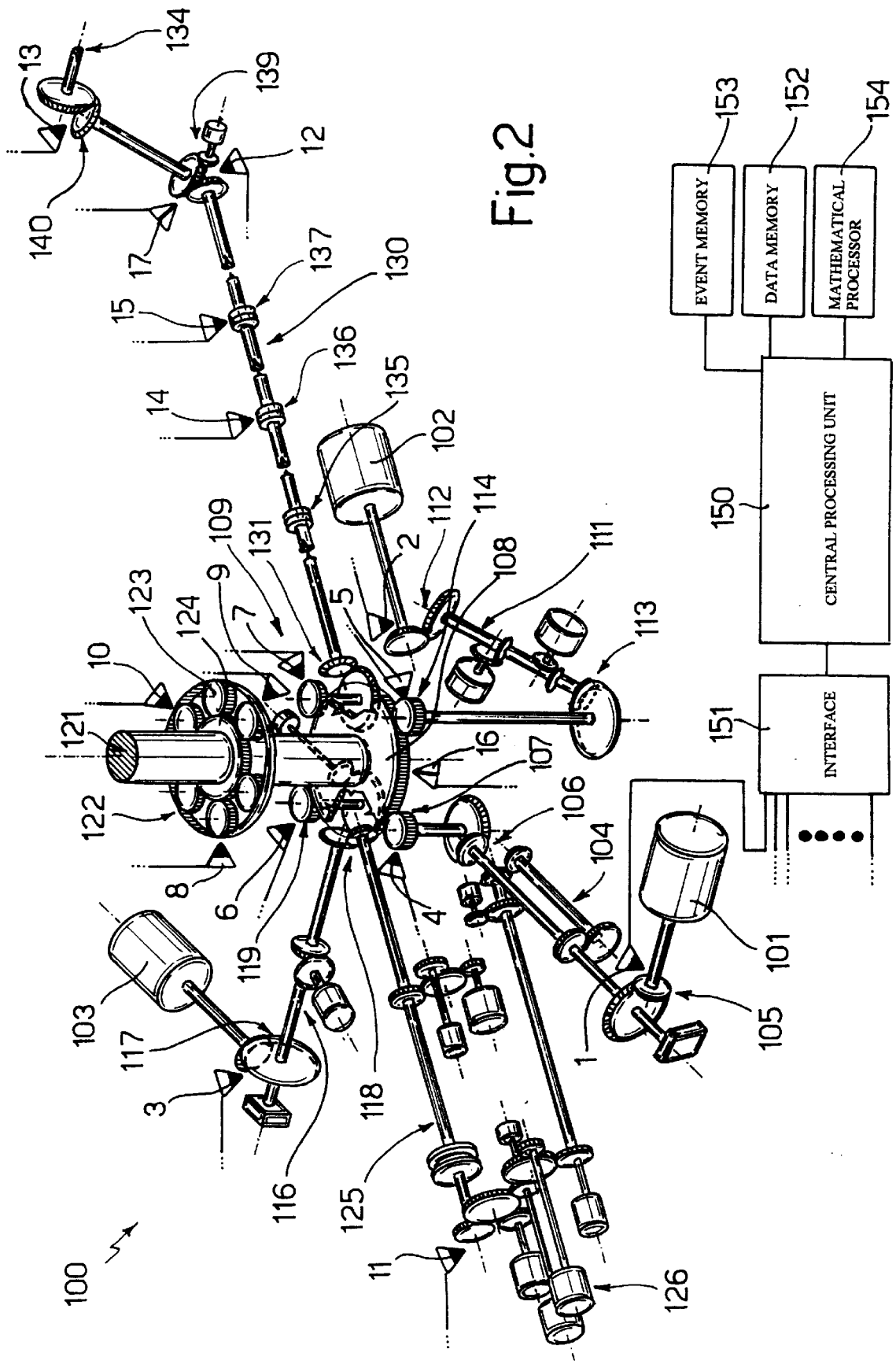
FIG. 2 shows a simplified diagram of the helicopter transmission and the location of various transmission member sensors.

FIGS. 1 and 2 show, schematically, the members of a helicopter 100 pertinent to the present invention.

In particular, helicopter 100 comprises a first engine 101, a second engine 102, and a third engine 103; first engine 101 is connected, by means of a first transmission line 104 comprising a first, second and third reducer 105–107, to an input gear 108 of a main gear assembly 109; second engine 102 is connected to input gear 108 by means of a second transmission line 111 comprising a fourth, fifth and sixth reducer 112–114; and third engine 103 is connected to input gear 108 by means of a third transmission line 116 comprising a seventh, eighth and ninth reducer 117–119.

Input gear 108 is connected to a rotor 121 of helicopter 100 by means of an epicyclic reducer 122 forming part of main gear assembly 109 and comprising six planet gears 123 and a sun gear 124; and input gear 108 is also connected— by means of a fourth transmission line 125 also connected to first transmission line 104—to an accessory box indicated schematically by 126, and to a fifth transmission line 130 connected to a tail rotor 134 and comprising a power take-off gear 131, intermediate joints 135–137, an intermediate gearbox 139, and a tail gearbox 140.

FIG. 2 shows fifteen acceleration sensors 1–15 and two azimuth sensors 16, 17 fitted close to the reduction stages as indicated in Table I below.

TABLE I

| Sensor | Pos. | Sensor | Pos. | Sensor | Pos. |
|---|---|---|---|---|---|
| 1 | 105 | 7 | 131 | 13 | 140 |
| 2 | 112 | 8 | 122 (front) | 14 | 136 |
| 3 | 117 | 9 | 122 (right) | 15 | 137 |
| 4 | 107 | 10 | 122 (left) | 16 | 108 |
| 5 | 114 | 11 | 126 | 17 | 139 |
| 6 | 119 | 12 | 139 | | |

Helicopter 100 also comprises a data processing unit 150 connected to sensors 1–17 by an interface unit 151 for sampling and digitizing the sensor signals, and to a data memory 152, an event memory 153, and a mathematical processor 154.

The monitoring method described below provides for improving the "visibility" of vibrational irregularities in the six planet gears 123 and the sun gear 124 of epicyclic reducer 122 on the basis of signals supplied by acceleration sensors 8–10.

The monitoring method provides for processing a signal s(t), supplied by whichever of acceleration sensors 8–10 is considered in each case, using a signal s1(t) supplied by azimuth sensor 16 at input gear 108. Signal s(t) is a vibratory signal (related to the rotation frequency of epicyclic reducer 122) and is affected by random noise as well as by noise related to other nearby rotary members.

Figure 3:
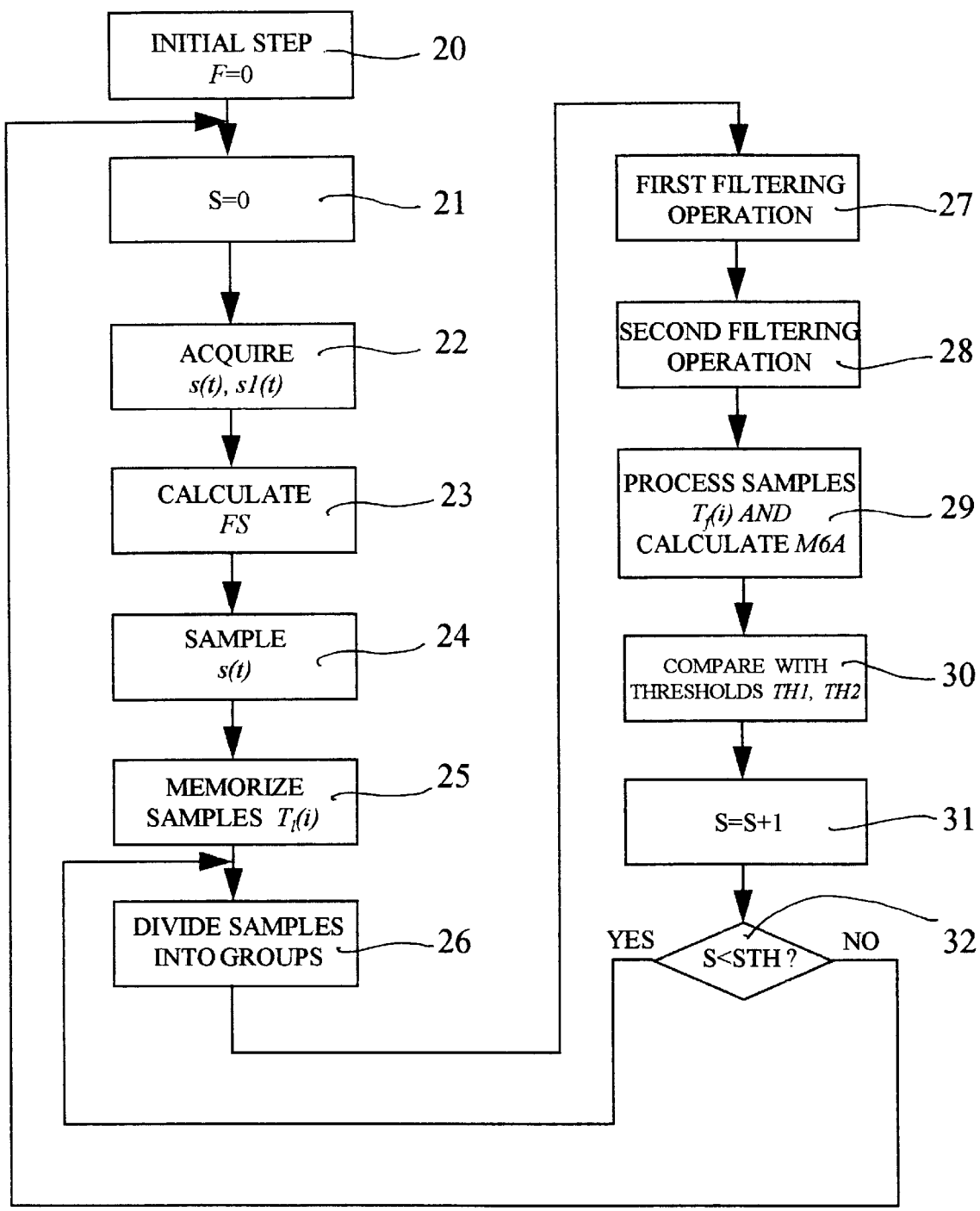
FIGS. 3–6 show flow charts of steps in a first embodiment of the method according to the invention.

To monitor planet gears 123, the method, as shown in FIG. 3, comprises an initial step, in which a variable F (explained later on with reference to FIG. 6) is set to a first predetermined value, e.g. 0 (block 20).

A repetition counter S (explained later on with reference to FIG. 5) is then set to a first predetermined value, e.g. 0 (block 21).

The signal s(t) supplied in each case by one of sensors 8–10 and the signal s1(t) supplied by azimuth sensor 16 are then acquired (block 22), and a sampling frequency FS is calculated by multiplying the frequency of signal s1(t) by a memorized coefficient KT equal to the ratio between two prime whole numbers, so that the resulting sampling frequency FS is correlated to the frequency of azimuth sensor 16, and is such as to supply exactly NJ points (where NJ is a power of 2) of signal s(t) for each revolution of the monitored shaft (block 23).

Signal s(t) is then sampled at frequency FS to obtain an initial sequence of samples $T_1(i)$ referred to the sensor in question and to each l-th revolution (block 24); and samples $T_1(i)$ in the initial sequence are memorized in data memory 152 (block 25).

Samples $T_1(i)$ in the initial sequence are then divided into groups, each defined by NJ samples $T_1(i)$, where NJ=1024 (block 26). More specifically, the groups are arranged in succession and are each identifiable by the respective position occupied in the succession; and the first group (i.e. the group in position 1) is formed starting from the first sample in the sequence.

A first filtering operation is then performed on the groups of samples to obtain a first intermediate sequence of samples $T_1(i)$ comprising 1024 samples (block 27). The filtering operation is preferably performed using the sequence of steps shown in FIG. 4 and described later on.

Figure 7:
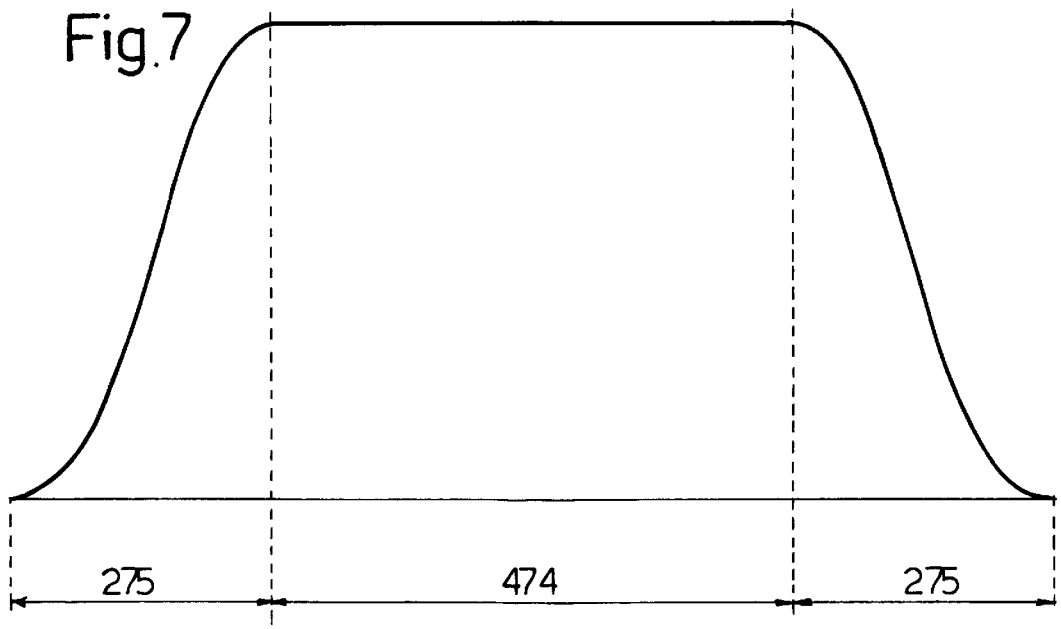
FIG. 7 shows a filtering window used in the first embodiment of the method according to the invention.

A second filtering operation is then performed on the 1024 samples in the first intermediate sequence to obtain a second intermediate sequence of samples $T_f(i)$ also comprising 1024 samples (block 28). In particular, the second filtering operation provides for multiplying the samples $T_{1m}(i)$ in the first intermediate sequence by a function F(t) of the type shown in FIG. 7 and having the equation:

$$F(t) = \begin{cases} \sin(t)/2 & (\text{where} -\pi/2 \le t \le \pi/2) \quad \text{for the first 275 samples} \\ 1 & \text{for the 474 central samples} \\ \sin(t)/2 & (\text{where } \pi/2 \le t \le 3\pi/2) \quad \text{for the last 275 samples} \end{cases}$$

That is, the time window F(t) does not alter the amplitudes of the 474 central samples, alters the amplitudes of the first 275 samples by multiplying them by values increasing sinusoidally from 0 to 1, and alters the amplitudes of the last 275 samples by multiplying them by values decreasing sinusoidally from 1 to 0. The above filtering operation may conveniently be performed by multiplying the amplitudes of the 550 lateral samples by tabled values.

Figure 5:
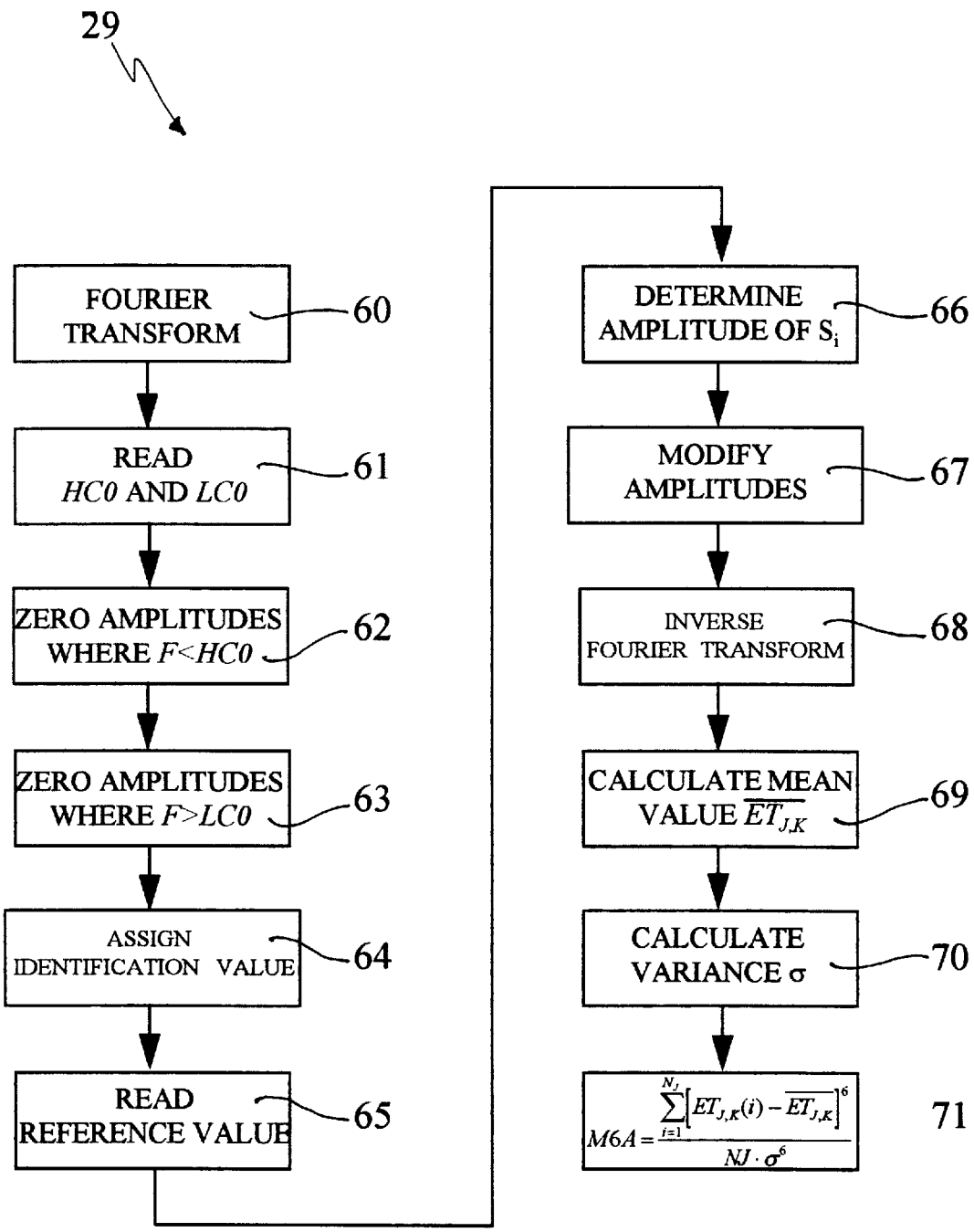

The second intermediate sequence of samples $T_f(i)$ is then processed, as described in detail later on with reference to FIG. 5, to obtain a final sequence of samples $ET_{J,K}(i)$ of which a sixth-order moment M6A is calculated (block 29).

Figure 6:
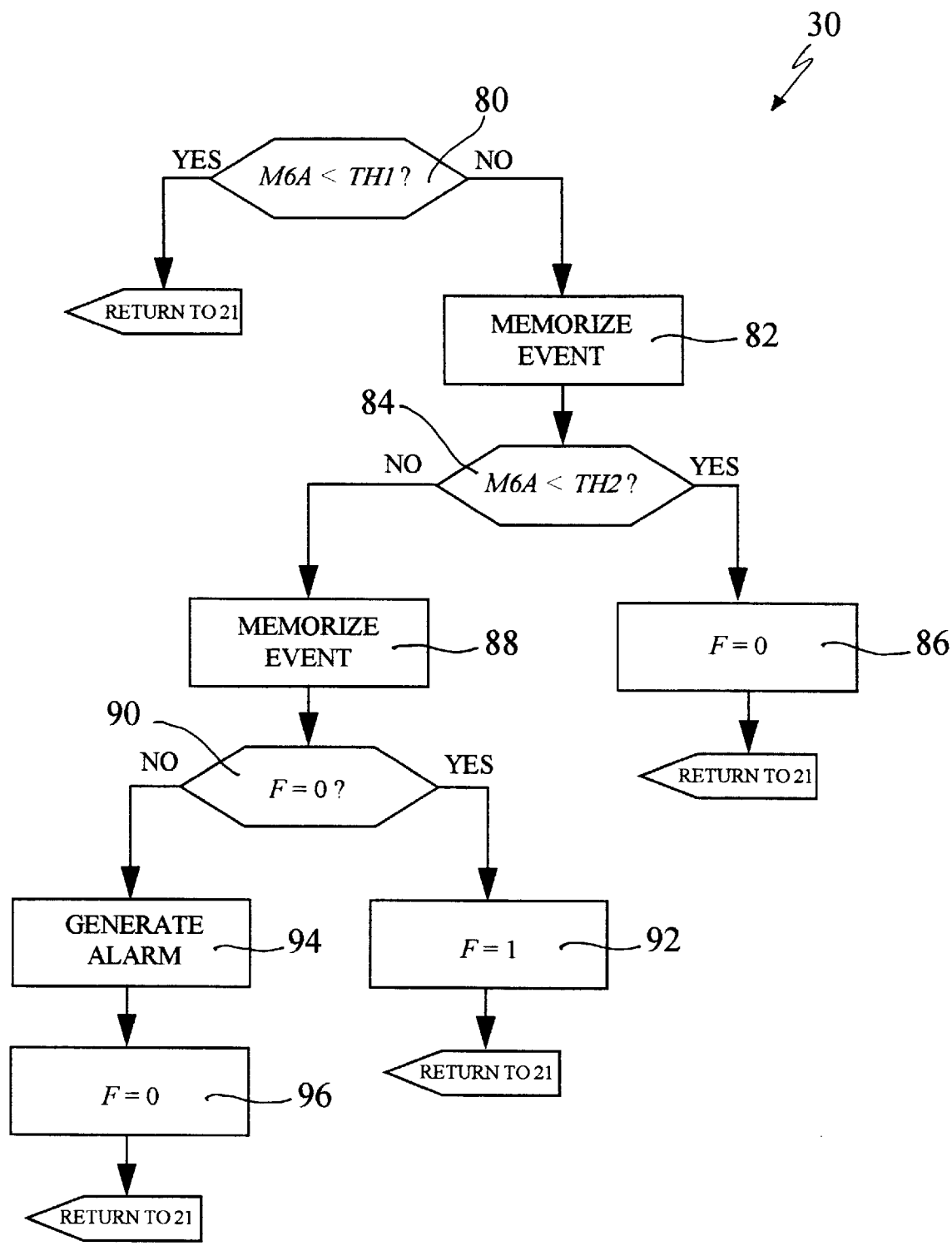

Central processing unit 150 then compares the sixth-order moment M6A with two threshold values TH1, TH2 (where TH1<TH2) to generate, if necessary, alarm signals (block 30) according to the procedure described in detail later on with reference to FIG. 6.

Repetition counter S is then increased one unit (block 31), and the value of the counter is compared with a predetermined maximum value STH related to the number of planet gears, in this case 6 (block 32). If the value of repetition counter S is less than STH (YES output of block 32), block 32 goes back to block 26, and the operations in blocks 26–32 are repeated with the samples divided into groups according to the value of repetition counter S and as described in detail later on. Conversely, if the value of repetition counter S is greater than STH (NO output of block 32), block 32 goes back to block 21 to continue monitoring with the next portion of signal s(t).

Figure 4:
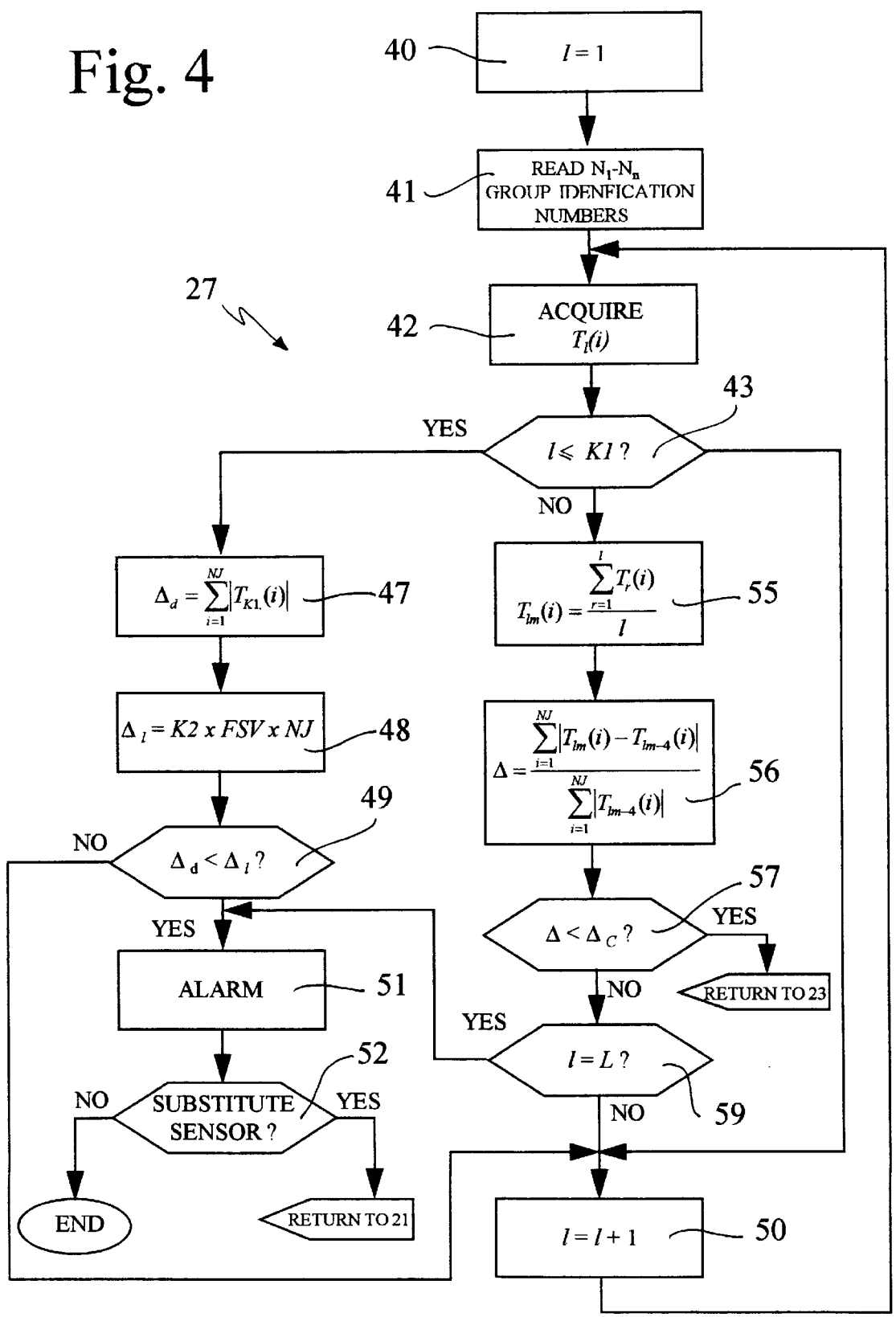

The first filtering operation in block 27 is conveniently performed as described below with reference to FIG. 4.

To begin with, a group counter l is set to 1 (block 40). A sequence of identification numbers $N_1-N_n$ is then read in data memory 152, each identification number representing the position of a respective group of samples in the succession of groups defined in block 26, and the groups of samples having positions $N_1-N_n$ in the succession of groups defined in block 26 are identified (block 41).

The group of samples having position $N_1$—which, as stated, comprises 1024 samples $T_1(i)$, where l is the value of the group counter indicated above—is then acquired (block 42).

The value of counter l, in particular whether it is less than or equal to a predetermined value K1, is determined (block 43); and, if counter l is less than or equal to K1 (fewer than K1 groups of samples acquired—YES output of block 43), the availability of the signal is determined by calculating (block 47) the sum $\Delta_d$ of the samples acquired at the l-th acquisition, according to the equation:

$$\Delta_d = \sum_{i=1}^{NJ} |T_{KJ}(i)|$$

A limit value $\Delta_1$ is then calculated (block 48) according to the equation:

$$\Delta_1 = K2 \times FSV \times NJ$$

where FSV is the bottom-scale value, and K2 a predetermined constant much lower than 1; and a check is made (block 49) to determine whether the calculated sum $\Delta_d$ is less than the limit value $\Delta_1$. In the event of a negative response (NO output of block 49), the signal is considered to exist, counter l is increased (block 50), and block 50 goes back to block 42 to acquire a further 1024 samples $T_1(i)$ relative to the next group of samples having position $N_1$. Conversely (YES output of block 49), the signal is considered nonexistent and an alarm signal is generated (block 51); a check is made (block 52) to determine the presence of a substitute sensor (e.g. sensor 10 for sensor 8); in the event of a positive response (YES output of block 52), block 52 goes back to block 21 in FIG. 3 to repeat the procedure on the substitute sensor; and, in the absence of a substitute sensor, or if convergence is not reached even with the substitute sensor (NO output of block 52), the procedure is interrupted.

Conversely, if counter l is greater than K1 (groups of samples having positions $N_1, N_2, \ldots, N_{K1}$ have been acquired in succession—NO output of block 43), block 43 goes on to a block 55, which calculates the average synchronous time series $T_{1m}(i)$ defining the first intermediate sequence of samples $T_{1m}(i)$, according to the equation:

$$T_{lm}(i) = \frac{\sum_{r=1}^{l} T_r(i)}{l} \quad i = 1 \ldots NJ$$

i.e. the mean value of each sample $T_1(i)$ over the l acquisitions considered is calculated.

Convergence of the averaging process is then determined by calculating a convergence value $\Delta$ given by the sum, over all the samples, of the absolute value of the difference between the actual mean value of each sample and the mean value calculated in a previous acquisition (at distance 4) divided by the sum of the mean samples in the previous acquisition considered (at distance 4), according to the equation:

$$\Delta = \frac{\sum_{i=1}^{NJ} |T_{lm}(i) - T_{lm-4}(i)|}{\sum_{i=1}^{NJ} |T_{lm-4}(i)|}$$

where $T_{1m}(i)$ represents the i-th sample of the l-th iteration, and $T_{1m-4}(i)$ represents the i-th sample of the l–4-th iteration (block 56). A check is then made to determine whether the calculated convergence value is less than or equal to a predetermined permissible minimum convergence value $\Delta_c$ (block 57). In the event of a positive response (YES output), the convergence process is interrupted, and block 57 goes back to the main program (block 23 in FIG. 3). Conversely, a check is made to determine whether the averaging process has already been performed a predetermined maximum number of times L, where L=60 (block 59). If the group (acquisition) counter l is less than L (NO output), the counter is increased (block 50) and the operations described above are repeated. Conversely (YES output), the procedure for generating an alarm signal and possibly repeating the procedure with a substitute sensor, as described with reference to blocks 51–52, is repeated.

The step performed in block 29 of FIG. 3, in which the second intermediate sequence of samples $T_f(i)$ is processed to obtain, and then calculate the sixth-order moment M6A of, the final sequence of samples $ET_{J,K}(i)$, is conveniently performed as described below with reference to FIG. 5.

To begin with, the fast Fourier transform (FFT) F(k) of the second intermediate sequence of samples $T_f(i)$ is calculated (block 60), preferably using mathematical processor 154.

Figure 8:
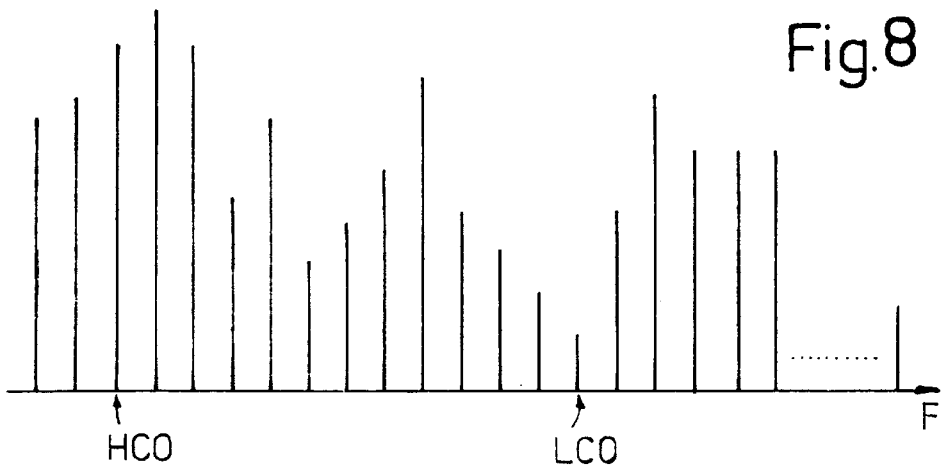
FIGS. 8–10 show frequency spectra relative to the method according to the invention.

Transform F(k) gives the FIG. 8 frequency spectrum of the second intermediate sequence of samples $T_f(i)$, which defines a third intermediate sequence of samples $S_1$, each having a respective frequency and a respective amplitude; and the amplitude of each sample is expressed in Cartesian representation, i.e. by a complex number having a real part and an imaginary part.

A first and a second reference frequency HC0, LC0—where HC0<LC0—specific to the six planet gears 123, are then read in data memory 152 (block 61).

Figure 9:
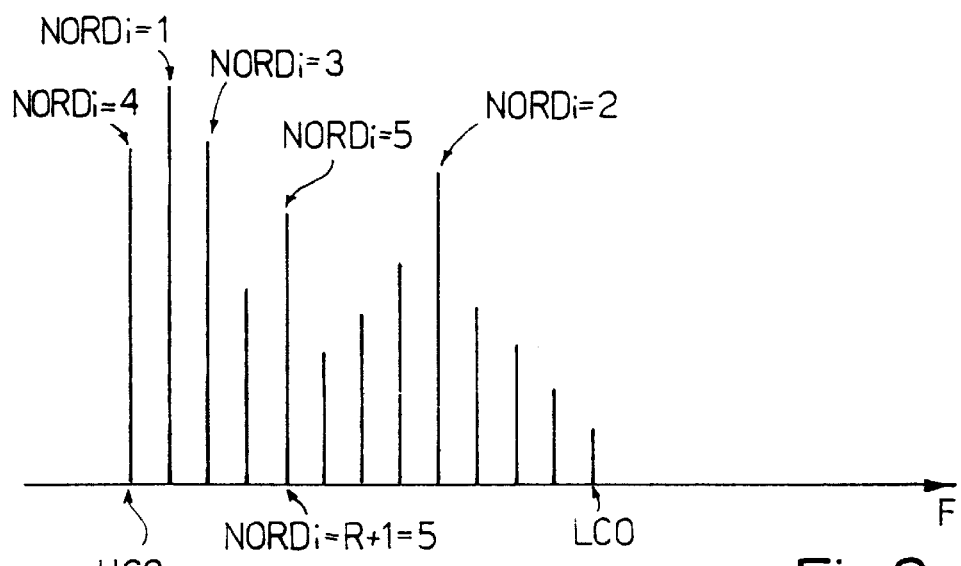

The amplitudes of the samples, in the third intermediate sequence of samples $S_1$, of a frequency below first reference frequency HC0 are then zeroed (block 62), and the amplitudes of the samples of a frequency above second reference frequency LC0 are zeroed (block 63) to obtain a fourth intermediate sequence of samples $S_2$ as shown in FIG. 9.

As shown in FIG. 9, each sample in the fourth intermediate sequence of samples $S_2$ is then assigned a respective identification value NORDi according to a rule of assignment whereby the samples are numbered in order of decreasing amplitude (i.e. working from the highest- to the lowest-amplitude sample) and, starting from the highest-amplitude sample, are assigned respective whole identification values NORDi increasing from value 1 (block 64).

A reference value R assigned to the first and second reference frequency HC0, LC0 read in block 61 is then read in data memory 152 (block 65).

The amplitude of the specific sample $S_i$, in the fourth intermediate sequence of samples $S_2$, having an identification value NORDi equal to reference value R increased by one unit (i.e. NORDi=R+1) is then determined (block 66).

Figure 10:
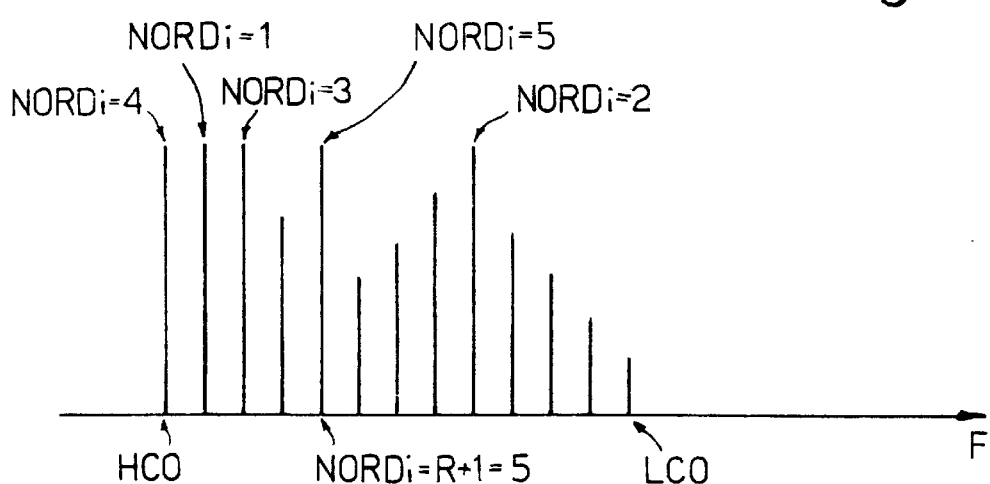

The amplitudes of the samples, in the fourth intermediate sequence of samples $S_2$, having identification values NORDi below reference value R increased by one unit (i.e. NORDi<R+1) and therefore, according to said rule of assignment, of a higher amplitude than sample $S_i$, are then modified. More specifically, the amplitudes of said samples are modified (block 67) by equalling them to the amplitude of sample $S_i$ determined above, to obtain a fifth intermediate sequence of samples $S_3$ defining a modified frequency spectrum as shown in FIG. 10. The FIG. 10 spectrum is obtain when reference value R equals 4, so that the amplitudes of the samples having NORDi=1, 2, 3, 4 are equalled to the amplitude of sample $S_i$ having NORDi equal to 5.

The amplitudes of said samples must be modified without altering their phase, which is done either by reducing by equal percentage amounts the real part and imaginary part of each of the complex numbers representing the samples, or by expressing the samples in a polar representation by means of two-dimensional vectors, each defined by the absolute value (amplitude) and the phase of the sample, and so reducing only the absolute value of each vector.

The inverse fast Fourier transform (IFFT) of the modified spectrum is then calculated, preferably using mathematical processor 154, to obtain said final sequence of samples $ET_{J,K}(i)$ (block 68).

The mean value $\overline{ET_{J,K}}$ (block 69) and the standard deviation σ (block 70) of the final sequence of samples $ET_{J,K}(i)$ is then calculated.

The sixth-order moment M6A of the final sequence of samples $ET_{J,K}(i)$ is then calculated (block 71) according to the equation:

$$M6A = \frac{\sum_{i=1}^{NJ} [ET_{J,K}(i) - \overline{ET_{J,K}}]^6}{NJ \cdot \sigma^6} \quad 1)$$

where NJ, as stated, equals 1024.

The sixth-order moment M6A of the final sequence of samples $ET_{J,K}(i)$ is used to indicate dispersion about the mean value of the values assumed by the sequence. More specifically, the sixth-order moment assigns more weight to the points furthest from the mean value than does the second-order moment (variance), and is therefore particularly useful for detecting defects in a gear, e.g. cracks in the gear teeth, by assigning greater weight to local defects. In which case, in fact, the respective sensor generates high-amplitude but fairly short pulses, and calculating a sixth-order moment provides for significantly identifying the contribution of the pulses.

As stated, the operations in blocks 26–32 in FIG. 3 are repeated six times (i.e. as long as the value of repetition counter S is below STH) and by dividing the samples into groups according to the value of repetition counter S. More specifically, at the first performance of the operations in blocks 26–32 (where S=0), the first group of samples is formed starting from the first sample in the initial sequence, so that the following groups are formed as described previously. At each successive performance of the operations in blocks 26–32, however, the initial sample in each group of samples is "shifted" by 548 samples with respect to the previous performance, i.e. the groups of samples are formed starting from respective first samples, the position of each of which in the initial sequence is "shifted" by 548 samples with respect to the previous performance.

The first group of samples is therefore formed each time starting from sample W=1+548*S, and the following groups are shifted accordingly.

A respective sixth-order moment M6A is then calculated for each performance and compared with threshold values TH1 and TH2.

The threshold comparison and alarm generating step in block 30 of FIG. 3 is conveniently performed as described below with reference to FIG. 6.

To begin with, sixth-order moment M6A is compared with first threshold TH1 (block 80); if M6A<TH1 (YES output), block 80 goes back to block 21 in FIG. 3 to continue monitoring with the next group of samples; conversely, if threshold TH1 has been exceeded (NO output of block 80), the event is memorized in event memory 153 (block 82) and M6A is compared with second threshold TH2 (block 84). If M6A<TH2 (YES output of block 84), variable F (initialized in block 20 of FIG. 3 to memorize whether threshold TH2 has already been exceeded) is set to (or confirmed at) the first predetermined value (0 in the example shown) (block 86), and block 86 goes back to block 21 of FIG. 3 to continue monitoring with the next group of samples. Conversely (NO output of block 84), the event is memorized in event memory 153 (block 88) and the value of variable F is determined (block 90). In particular, if variable F is at the first predetermined value (YES output), F is set to a second predetermined value, e.g. 1, (block 92), and block 92 goes back to block 21 of FIG. 3 to continue monitoring with the next group of samples. Conversely, if variable F is at the second predetermined value, i.e. threshold TH2 has already been exceeded (NO output of block 90), a pilot alarm signal is generated (block 94), variable F is again set to the first predetermined value (block 96), and block 96 goes back to block 21 of FIG. 3 to continue monitoring with the next samples.

A monitoring method similar to the one described above with reference to FIGS. 3–6 may also be used to improve the "visibility" of any vibrational irregularity in sun gear 124 of epicyclic reducer 122.

Figure 11:
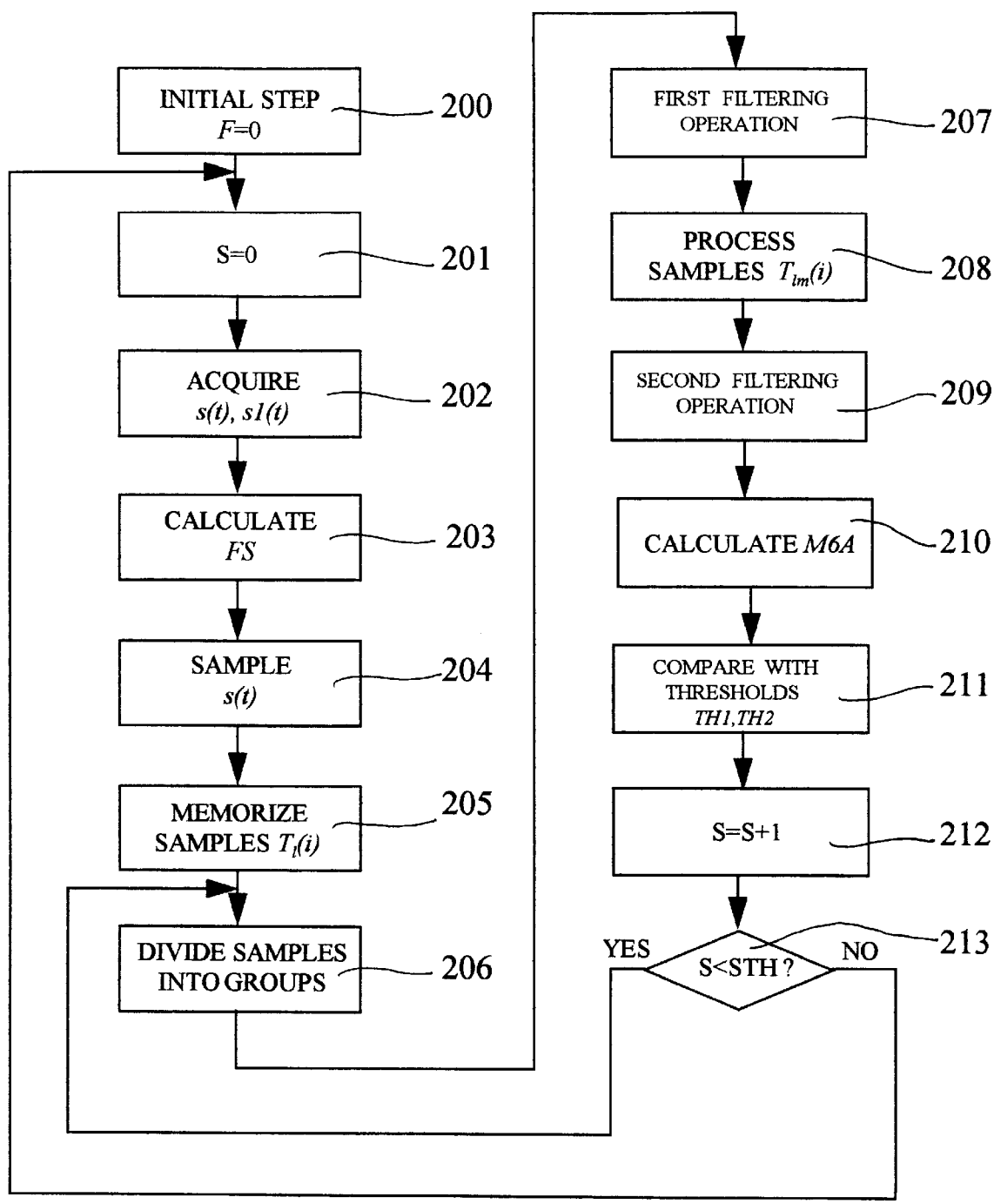
FIG. 11 shows a flow chart of steps in a second embodiment of the method according to the invention.

As shown in FIG. 11, to monitor sun gear 124, the method, like the one for monitoring the six planet gears 123, comprises initializing variable F (block 200), setting repetition counter S to 0 (block 201), and acquiring signals s(t) and s1(t) (block 202).

These are followed by calculating the specific sampling frequency FS of sun gear 124 (block 203); sampling signal s(t) at frequency FS to obtain the initial sequence of samples $T_1(i)$ (block 204); and memorizing samples $T_1(i)$ in data memory 152 (block 205).

The samples $T_1(i)$ in the initial sequence are then divided (block 206) into groups comprising NJ samples $T_1(i)$, where NJ=256 (as opposed to NJ=1024 in the case of planet gears 123); and the groups of samples are then subjected to a first filtering operation (block 207) similar to the one described with reference to FIG. 4, except that, in addition to the group of (256) samples having position $N_1$, the next group of samples is also acquired at each revolution, so as to acquire a total of 512 samples at each revolution, so that, in this case, the first filtering operation gives a first intermediate sequence of samples $T_{1m}(i)$ comprising 512 samples.

The first intermediate sequence of samples $T_{1m}(i)$ is then processed in the same way as described with reference to FIG. 5 to obtain a second intermediate sequence of samples $T_k(i)$ (block 208), the sixth-order moment M6A of which, however, is not calculated immediately.

The second intermediate sequence of samples $T_k(i)$, in fact, is subjected to a second filtering operation (block 209), as described below, to obtain a final sequence of samples $ET_{JK}(i)$, the sixth-order moment M6A of which is calculated according to equation 1) (block 210).

As in the method described with reference to FIG. 3, sixth-order moment M6A is then compared with thresholds TH1, TH2 (block 211).

Figure 12:
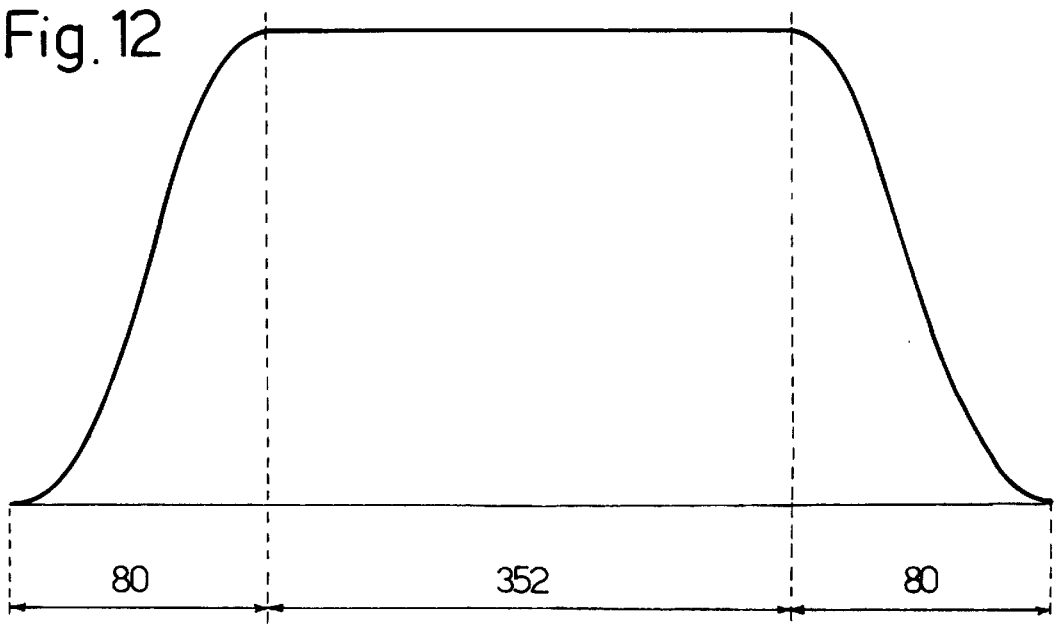
FIG. 12 shows a filtering window used in the second embodiment of the method according to the invention.

More specifically, the second filtering operation provides for filtering the samples $T_{km}(i)$ in the second intermediate sequence by means of a time window F(t) of the type shown in FIG. 12, i.e. having the equation:

$$F(t) = \begin{cases} \sin(t)/2 & (\text{where} -\pi/2 \leq t \leq \pi/2) & \text{for the first 80 samples} \\ 1 & & \text{for the 352 central samples} \\ \sin(t)/2 & (\text{where } \pi/2 \leq t \leq 3\pi/2) & \text{for the last 80 samples} \end{cases}$$

For sun gear 124 also, repetition counter S is increased by one unit (block 212), and the value of the counter is compared with threshold value STH, where STH=8 (block 213), so that the operations in blocks 206–213 are performed eight times.

As in the previous method, at each performance of the operations in blocks 206–213, the initial sample in each group is "shifted" with respect to the previous performance, but in this case by 285 samples.

The advantages of the method described are as follows. In particular, calculating sixth-order moment M6A provides for diagnosing local defects, e.g. cracks in severely stressed parts of epicyclic reducer 122, which may sooner or later result in failure of the reducer.

Moreover, the method provides for distinguishing useful monitoring components from random noise and noise generated by relative movement of the planet gears or by other nearby moving members.

Clearly, changes may be made to the method as described and illustrated herein without, however, departing from the scope of the present invention. In particular, the filtering and averaging procedure and the alarm generating procedure may differ from those described.

We claim:

1. A method of monitoring an epicyclic assembly of a vehicle equipped with acceleration sensors, comprising the steps of:
   a) acquiring a signal from an acceleration sensor mounted on the epicyclic assembly for detecting the acceleration of a moving member of the epicyclic assembly;
   b) sampling said signal at a sampling frequency to obtain an initial sequence of samples;
   c) dividing the samples in said initial sequence into groups, each defined by a predetermined number of samples, said groups of samples being arranged in succession and each having a respective position in said succession;
   d) acquiring predetermined groups of samples;
   e) processing said predetermined groups of samples to obtain a final sequence of samples; and
   f) generating an alarm signal dependent upon a characteristic of said final sequence of samples.

2. A method as claimed in claim 1, also comprising the steps of:
   g) calculating a sixth-order moment (M6A) of said final sequence of samples ($ET_{JK}(i)$); and
   h) comparing said sixth-order moment (M6A) with at least a first predetermined threshold (TH1, TH2).

3. A method as claimed in claim 1, characterized in that said step e) comprises the steps of:
   h) filtering said predetermined groups of samples to obtain a first series of samples ($T_j(i)$); and
   i) processing said first series of samples ($T_j(i)$) to obtain said final sequence of samples ($ET_{JK}(i)$).

4. A method as claimed in claim 3, characterized in that said step i) comprises the steps of:

j) calculating a transform in the frequency domain of said first series of samples ($T_{1m}(i)$) to obtain a first number of samples ($S_1$), each of said samples having a respective amplitude and a respective frequency;

k) acquiring a first and a second reference frequency (HC0, LC0);

l) modifying the amplitudes of first samples, in said first number of samples ($S_1$), having frequencies with a first predetermined relationship with said first and second reference frequency (HC0, LC0), to obtain a second number of samples ($S_2$);

m) assigning each sample in said second number of samples ($S_2$) a respective identification value (NORDi) according to a predetermined rule of assignment;

n) acquiring a reference value (R); and o) modifying the amplitudes of second samples, in said second number of samples ($S_2$), having identification values (NORDi) with a second predetermined relationship with said reference value (R), to obtain a third number of samples ($S_3$).

5. A method as claimed in claim 4, characterized in that said transform is a Fourier transform.

6. A method as claimed in claim 4, characterized in that said step l) comprises the steps of:

p) zeroing the amplitudes of the samples, in said first number of samples ($S_1$), having frequencies lower than said first reference frequency (HC0); and q) zeroing the amplitudes of the samples, in said first number of samples ($S_1$), having frequencies higher than said second reference frequency (LC0).

7. A method as claimed in claim 4, characterized in that said step m) comprises the step of:

r) identifying said samples in said second number of samples ($S_2$) in order of decreasing amplitude, wherein said identification values (NORDi) are whole numbers, and, commencing with the highest-amplitude sample, said samples in said second number of samples ($S_2$) are assigned respective said identification values (NORDi) increasing in value from a predetermined value.

8. A method as claimed in claim 4, characterized in that said step o) comprises the steps of:

s) determining the amplitude of a reference sample, in said second number of samples ($S_2$), having an identification value (NORDi) with a third predetermined relationship with said reference value (R); and t) altering the amplitudes of said second samples in said second number of samples ($S_2$) on the basis of said amplitude of said reference sample.

9. A method as claimed in claim 8, characterized in that said step s) comprises the step of:

u) determining said reference sample, in said second number of samples ($S_2$), having an identification value (NORDi) equal to said reference value (R) increased by a predetermined quantity.

10. A method as claimed in claim 8, characterized in that said second samples in said second number of samples ($S_2$) have respective identification values (NORDi) lower than the identification value (NORDi) of said reference sample; and in that said step t) comprises the step of:

v) equalling the amplitudes of said second samples to the amplitude of said reference sample to obtain said third number of samples ($S_3$).

11. A method as claimed in claim 4, characterized by comprising the step of calculating a sixth-order moment (M6A) of said final sequence of samples ($ET_{J,K}(i)$); said step of calculating a sixth-order moment (M6A) comprising the steps of:

x) calculating an inverse transform in the time domain of said third number of samples ($S_3$) to obtain said final sequence of samples ($ET_{J,K}(i)$);

y) calculating the mean value $\overline{ET_{J,K}(i)}$ of said final sequence of samples ($ET_{J,K}(i)$));

w) calculating the standard deviation ($\sigma$) of said final sequence of samples ($ET_{J,K}(i)$); and z) calculating said sixth-order moment (M6A) according to the equation:

$$M6A = \frac{\sum_{i=1}^{NJ}[ET_{J,K}(i) - \overline{ET_{J,K}}]^6}{NJ \cdot \sigma^6}$$

where M6A is said sixth-order moment, $ET_{J,K}(i)$ is said final sequence of samples, NJ is said number of samples of said final sequence of samples $ET_{J,K}(i)$, $\overline{ET_{J,K}(i)}$ is said mean value of said final sequence of samples $ET_{J,K}(i)$ and $\sigma$ is said standard deviation of said final sequence of samples $ET_{J,K}(i)$.

12. A method as claimed in claim 11, characterized in that said inverse transform is an inverse Fourier transform.

13. A method as claimed in claim 3, characterized in that said step h) comprises the steps of:

h1) performing a first filtering operation of said predetermined groups of samples to obtain a second series of samples ($T_{1m}(i)$); and h2) performing a second filtering operation of said second series of samples ($T_{1m}(i)$) to obtain said first series of samples ($T_f(i)$).

14. A method as claimed in claim 13, characterized in that said step h1) comprises the steps of:

h11) acquiring at least some of said predetermined groups of samples ($T_1(i)$); and h12) calculating an average time series defining said second series of samples ($T_{1m}(i)$), according to the equation:

$$T_{lm}(i) = \frac{\sum_{r=1}^{l} T_r(i)}{l} \quad i = 1 \ldots NJ$$

where $T_r(i)$ is said groups of samples acquired in step h11), and l is a counter for counting the number of groups of samples acquired.

15. A method as claimed in claim 13, characterized in that said step h2) comprises the step of:

h21) multiplying said second series of samples ($T_{1m}(i)$) by a function (F(t)) having a constant central portion, and lateral portions decreasing from said central portion.

16. A method as claimed in claim 1, characterized in that said step d) comprises the steps of:

d1) acquiring a sequence of identification numbers ($N_1$–$N_n$), each representing the position of a respective group of samples in said succession of groups of samples;

d2) identifying, in said succession of groups of samples, groups of samples having positions corresponding to said identification numbers ($N_1$–$N_n$); and d3) acquiring the identified said groups of samples.

17. A method as claimed in claim 1, characterized by performing steps c) to e) a predetermined number (STH) of times.

18. A method as claimed in claim 17, characterized in that, at each performance of steps c) to e), the initial sample in each group is shifted by a predetermined number of samples with respect to the previous performance.

19. A method as claimed in claim 2, characterized in that said step of comparing said sixth-order moment (M6A) also comprises the step of comparing said sixth-order moment (M6A) with a second threshold (TH1, TH2).

20. A method as claimed in claim 2, further comprising the step of:

i) generating an alarm signal if said sixth-order moment exceeds said at least first determined threshold.

* * * * *